United States Patent [19]
de Belder et al.

[11] Patent Number: 4,814,437
[45] Date of Patent: Mar. 21, 1989

[54] METHOD FOR PREPARATION OF SULFATED POLYSACCHARIDES BY TREATING THE POLYSACCHARIDE WITH A REDUCING AGENT BEFORE SULFATION

[75] Inventors: Anthony N. de Belder; Leif G. Ahrgren; Tomas Mälson, all of Upsala, Sweden

[73] Assignee: Pharmacia AB, Upsala, Sweden

[21] Appl. No.: 159,370

[22] Filed: Feb. 25, 1988

[30] Foreign Application Priority Data

Jul. 7, 1986 [SE] Sweden .............................. 8603008-7

[51] Int. Cl.[4] ...................... C08B 15/00; C08B 31/00; C08B 37/00
[52] U.S. Cl. ................................. 536/18.7; 536/55.1; 536/55.3; 536/59; 536/61; 536/102; 536/107; 536/109; 536/112; 536/115; 536/118

[58] Field of Search ................... 525/54.1, 54.2, 54.11; 514/34, 56, 822, 824, 350; 530/359; 536/18.7, 20, 21, 22, 51, 56, 102, 112, 55.1, 55.3, 61, 45, 59, 107, 109, 115, 118

[56] References Cited

U.S. PATENT DOCUMENTS 3,947,352 3/1976 Cuatrecasas et al. .............. 525/54.2
4,740,594 4/1988 Mauzac et al. ....................... 536/51

Primary Examiner—John Kight
Assistant Examiner—C. Azpuru
Attorney, Agent, or Firm—Fred Philpitt

[57] ABSTRACT

A new method for preparation of sulfated polysaccharides by means of pyridine-chlorosulfonic acid reagents. The polysaccharide is before sulfation treated with a reducing agent, e.g. sodium borohydride.

12 Claims, No Drawings

METHOD FOR PREPARATION OF SULFATED POLYSACCHARIDES BY TREATING THE POLYSACCHARIDE WITH A REDUCING AGENT BEFORE SULFATION

The present invention is related to a new improved method for preparation of sulfated polysaccharides by means of the pyridine-chlorosulfonic acid reagent. The method gives a product with very low contents of pyridinium residues.

Many components of biological origin are polyelectrolytes and their interaction is of great importance in several biochemical reactions. Synthetic polyelectrolytes similar to those occurring naturally have been the subject of a considerable interest, for instance in connection with mechanistic studies of such reactions. Sulfated polysaccharides in general and dextran sulfate in particular have come to play an important role as model substances, for instance in studies of cell-substrate interaction.

Synthesis of sulfated polysaccharides by reaction between the polysaccharide and a pyridine-chlorosulfonic acid reagent is a well established technique (see for instance references 1–6). Some of the reasons why the method is so popular is that the reagent is easily available an that the sulfation reaction proceeds with high yield.

We have now found that during synthesis, as the method has been described so far, various amounts of pyridinium substituents are introduced at the reducing end-groups of the polysaccharide chains. This effect will be more pronounced for the lower molecular weights polysaccharide fractions since the proportion of end-groups increases with drecreasing molecular weight. If it is assumed that one pyridinium group per polysaccharide chain is introduced, dextran sulfate with a molecular weight of 1000 and a substitution degree of 2.0 will have a nitrogen content of 1.4% while the corresponding value for a product with a molecular weight of 40000 is only 0.035 %.

Covalently bound nitrogen is accordingly introduced at the reducing end of the polysaccharide chains when a polysaccharide in solution is reacted with a sulfonic acid reagent or sulfur trioxide together with a nitrogen base, e.g. pyridine or secondary or tertiary amines, according to methods described in references cited above. The presence of quaternary amino substituents may affect quite considerably the physicalchemical or biological properties of the substance.

This invention presents a method for substantially eliminating the introduction of such pyridinium substitutents during the preparation of sulfated polysacchardies.

In the present method, the sulfation reaction is carried out in two separate steps. In the first step, the polysaccharide is treated with a reducing agent whereafter it is separated from the reaction mixture and then, in a second step, sulfated in a manner known per se, using said reagent.

Polysaccharides suitable for sulfation according to the present invention are e.g. partially hydrolysed fractions of dextran, starch and cellulose, derivatives of these, as well as glycosaminoglycans as, for example, hyaluronic acid, heparin and chondroitin sulfate. Further examples are found in the references cited above and which describe methods for sulfation of polysaccharides.

The reducing end-groups on the polysaccharides consist of aldehyde groups. Suitable agents for reducing these to alcohol groups are e.g. borohydrides, such as, potassium or sodium borohydride. With this type of reagent, the reaction is preferably carried out in alkaline medium, preferably at a pH in the range of from 7 to 11. The reaction could also be carried out by catalytic hydrogenation and this method as well as the reagents mentioned earlier are well known to persons skilled in the art.

The polysaccharide is according to the present method dissolved in a suitable solvent, for example water or methylsulfoxide, whereafter the reducing agent is added and the reaction is allowed to proceed for about 0.1 to 48 hours. The polysaccharide is then separated from the reaction mixture, for instance by precipitation with a lower alcohol, e.g. methanol or ethanol, and is optionally dried under vacuum at 40°–120° C. in a drying oven.

The sulfation reagent, for instance pyridine and chlorosulfonic acid, is mixed and the reduced polysaccharide is then added, preferably in portions, and the reaction is allowed to proceed for 0.5–10 hours. The reaction time should be minimized since new reducing end-groups may be formed during this step. The sulfated polysaccharide may then be recovered by precipitation, for instance, by pouring the reaction mixture into ethanol. In the further processing of the product, the precipitate is for instance dissolved in water and neutralized with alkali, whereafter the sulfate ions are precipitated by the addition of, for example, barium chloride. Active carbon is then added and the mixture stirred at a somewhat elevated temperature, ca 30° C.–70° C. After filtration, the polysaccharide is re-precipitated in ethanol and dried. The solution could also be dialyzed against distilled water.

The reducing end-groups of the polysaccharide are eliminated by this treatment with the reducing agent but the final produce—after sulfation—may netherthless contain trace amounts of pyridinium groups. The reason for this is, as mentioned earlier, that new reducing end-groups may be formed during the sulfation reaction. The proportion of pyridinium groups in the sulfated polysaccharide is however less than 500 ppm according to the present method. In order to minimise this side-reaction the reaction temperature should be kept as low and the reaction time as short as possible in order to achieve the desired degree of substitution.

The invention is now illustrated by a few non-limiting examples. Products according to the invention are sulfated polysaccharides prepared according to the method described above and which have a pyridinium content of less than 500 ppm.

Determination of the pyridinium content in a sulfated polysaccharide

The sulfated polysaccaride (about 100 mg) was carefully weighted and dissolved in 100 ml of a pH 4 buffer (6 ml glacial acetic acid mixed with water to 1 000 ml; pH adjusted with sodium hydroxide). The absorbance was determined at 260 nm and the values were related to a standard curve for N-methylpyridiniumiodide in the same buffer.

EXAMPLE 1

40 g of xylan (beech xylan from Benechemie, Müunich) was dissolved in 400 ml of water and pH was adjusted to 12.12 g of sodium borohydride was added and the solution was stirred at room temperature for 4 hours. After neutralising the mixture with diluted acetic acid, the xylan was precipitated in 500 ml of ethanol. After a further precipitation in ethanol, the product was dried in vacuo at 60° C. 10 ml of pyridine was transferred to a three-necked-flask and 3 ml of chlorosulfonic acid was then added with cooling and stirring. 2 g of the reduced xylan was added portionwise over about 0.1 hours and the reaction was allowed to continue for about 4.5 hours at a temperature of 60°–70° C. The warm mixture was poured into ethanol and the polysaccharide was filtered off. It was then dissolved in water, neutralized with alkali whereafter the sulfate ions were precipitated with barium chloride. 3 g of active charcoal was added to the warm solution (about 50°C.) and stirring continued for another hour. After filtering through an asbestos pad, the polysaccharide was precipitated in ethanol, filtered and dried. The yield was 3.6 g, the sulfur content 17% and the pyridinium content 400 ppm.

In a corresponding experiment, the xylan was sulfated without prior reduction. The yield in this case was 4.2 g, the sulfur content 18.1% and the pyridinium content was 8400 ppm. The pyridinium content was accordingly about 20 times higher with this prior art method.

EXAMPLE 2

Maize starch with a molecular weight of 5200 prepared by partial hydrolysis of native material was reduced and sulfated as described in Example 1. The yield was 4.5 g, the sulfur content 18.0% and the pyridinium content 300 ppm.

The corresponding values when the sulfation reaction was carried out without prior reduction was 4.2 g, 18% and 1900 ppm, respectively.

EXAMPLE 3

Dextran with a molecular weight of 3300 was prepared by partial hydrolysis of native dextran. A 1.5 g sample was reduced and hydrolysed according to Example 1. The yield was 13.4% and the pyridinium content was 470 ppm.

The corresponding values when the sulfation reaction was carried out without prior reduction were 4.5 g, 18.8% and 3411 ppm.

References

1. Ritzer H., Austrian Pat. No. 198429.
2. Gronvall A., Ingelman B. and Mosemann H.F., Swedish Pat. No. 118014.
3. Lee J., U.S. Pat. No. 2,599,564.
4. Gebauer-Fulnegg E., U.S. Pat. No. 1,734,291.
5. Cushing I.B. and Kratovil E.J., U.S. Pat. No. 2,755,275.
6. Vogler K., Swiss Pat. No. 326791.

We claim:

1. A method for producing sulfated polysaccharides by reacting the polysaccharide with a pyridine-chlorosulfonic acid reagent, wherein the polysaccharide before the sulfation reaction is treated with an agent which reduces most of the reducing end-groups of the polysaccharides.
2. A method according to claim 1 wherein the reducing agent is borohydride.
3. A method according to claim 1 wherein the reducing agent is sodium or potassium borohydride.
4. A method according to claim 1 wherein the polysaccharide is dextan, starch, cellulose or a derivative of these, or a glycosaminoglycan.
5. A method according to claim 2 wherein the polysaccharide is dextran, starch, cellulose or a derivative of these, or a glycosaminoglycan.
6. A method according to claim 3 wherein the polysaccharide is dextran, starch, cellulose or a derivative of these, or a clycosaminoglycan.
7. A method according to claim 1 wherein the polysaccharide is hyaluronic acid.
8. A method according to claim 2 wherein the polysaccharide is hyaluronic acid.
9. A method according to claim 3 wherein the polysaccharide is hyaluronic acid.
10. A method according to claim 4 wherein the polysaccharide is hyaluronic acid.
11. A method according to claim 5 wherein the polysaccharide is hyaluronic acid.
12. A method according to claim 6 wherein the polysaccharide is hyaluronic acid.

* * * * *